United States Patent [19]

Taniguchi et al.

[11] Patent Number: 5,020,057
[45] Date of Patent: May 28, 1991

[54] EASY DETECTION OF HEAD POSITION OF INFORMATION DATA VIA RECEPTION PROCESSING UNIT IN SYNCHRONOUS MULTIPLEX TRANSMISSION APPARATUS

[75] Inventors: Atsuki Taniguchi, Kawasaki; Haruo Yamashita, Yokohama; Tomohiro Ishihara, Hachioji; Takaaki Wakisaka, Kawasaki, all of Japan

[73] Assignee: Fujitsu Limited, Kawasaki, Japan

[21] Appl. No.: 444,864

[22] Filed: Dec. 4, 1989

[30] Foreign Application Priority Data

Dec. 5, 1988 [JP] Japan ................... 63-309097

[51] Int. Cl.⁵ .................................................. H04J 3/06
[52] U.S. Cl. ................... 370/102; 370/100.1; 370/105.1; 375/112
[58] Field of Search ............... 370/102, 105.1, 100.1, 370/82, 83; 375/112, 118

[56] References Cited

U.S. PATENT DOCUMENTS

| | | | |
|---|---|---|---|
| 4,562,573 | 12/1985 | Murano et al. | 370/105.1 |
| 4,763,324 | 8/1988 | Schwierz | 370/105.1 |
| 4,764,941 | 8/1988 | Choi | 370/102 |
| 4,811,340 | 3/1989 | McEachern et al. | 370/102 |

Primary Examiner—Douglas W. Olms
Assistant Examiner—Alpus H. Hsu
Attorney, Agent, or Firm—Staas & Halsey

[57] ABSTRACT

A reception processing unit receives digital data in successive data frames, each frame comprising a supervisory data field and an associated information data field and, further, a negative stuff or a positive stuff in accordance with need, and detects the head position of the information data field. An enable signal is produced only during and throughout a time interval in which the information data field appears in each successive, received data frame; a count operation of a counter is performed only during the interval of the enable signal. The head position is detected each time the counter finishes counting a number of bytes equal to the fixed length of the information data field.

3 Claims, 8 Drawing Sheets

EASY DETECTION OF HEAD POSITION OF INFORMATION DATA VIA RECEPTION PROCESSING UNIT IN SYNCHRONOUS MULTIPLEX TRANSMISSION APPARATUS

BACKGROUND OF THE INVENTION

1. Field of the Invention

The present invention relates to a system for sending and receiving data of the type where frames, each divided into a supervisory data field and an information data field in data format, are successively transmitted, in particular a synchronous multiplex transmitted, in particular a synchronous multiplex transmission apparatus, and more particularly relates to a receiving unit in such a synchronous multiplex transmission apparatus.

2. Description of the Related Art

Multiplexing of digital data on a transmission line is an essential technique for the efficient use of a transmission medium and economical signal transmission.

In particular, the synchronous multiplexing system proposed in CCITT Recommendation G.707, G.708, and G.709 multiplexes 50 Mbps unit data in frame units to enable transmission of several Gbps of data and enables realization of high speed, large volume data transmission.

In such a synchronous multiplexing system, as explained in further detail later, the data is transmitted in units of frames, each frame consisting of a fixed length supervisory data field and a fixed length information data field. A fixed length unit of information data is accommodated in the afore-mentioned information data field. The head position of the information data is indicated by a pointer in the supervisory data field.

Further, the CCITT recommendation defines a stuffing reception in consideration of the slight deviation between the clock frequency on the transmission side of the data and the clock frequency on the reception side due to, for example, temperature fluctuations on the transmission line. In this stuffing reception, there is a so-called "negative stuff" wherein part (byte 1 byte) of the supervisory data field is allocated to part of the information data and a so-called "positive stuff" wherein unnecessary stuff bits (1 byte), that is, dummy bits, are added as information data to the information data field.

In the above-mentioned synchronous multiplex transmission, in the state where no stuff is generated, the pointer indicates the head position of the information data, but when the stuff is generated, information on the type of the stuff, i.e., which of the negative stuff or positive stuff is generated, is indicated by the pointer. Therefore, when a stuff is generated, it is necessary to find the head position of the information data one frame before and the head position of the information data within the current frame in accordance with the type of the stuff generated. Currently, there is a demand for a synchronous multiplex transmission system wherein it is possible to easily detect the head positions.

In particular, as explained later, when a negative stuff is generated, there are cases in which the head positions of two information data fields are simultaneously present in a single frame, so it is impossible to find and specify the head position of the information data effectively. Further, when a positive stuff is generated, there are cases in which no head position of the information data exists at all in the frame, so it also is impossible to find and specify the head position of the information data effectively.

In a synchronous multiplex transmission apparatus, in particular in the receiving unit, one of the important operations is finding and specifying of the head positions of the information data from among the successive frames being transmitted in to and received by the receiving unit. The reason is that unless the head position of the information data can be specified, it is impossible to extract only the information data selectively from the successive frames.

SUMMARY OF THE INVENTION

The present invention is made in consideration of this point and has as its object the provision of a reception processing method and apparatus in synchronous multiplex transmission system which enables easy detection of the head position of the information data using simple hardware.

To achieve the above object, in the synchronous multiplex transmission system in accordance with the present invention, a reception processing unit successively receives a plurality of data frames comprised of respectively associated supervisory data fields, each having a fixed byte length Ls, and information data fields, each having a fixed byte length Li, and detects the heads of the information data fields from the data frames received, and outputs head detection signals, wherein the said reception processing unit comprises:

an information data field detection means which calculates only the interval in which each such information data fields exists and outputs an enable signal only during that interval; and a counting means which outputs the head detection signal simultaneously upon being reset to zero each time the count of a number of bytes equal to the said fixed byte length Li is completed, said counting means continuing the counting operation only during the interval in which said enable signal is output and stopping the counting operation when the said enable signal is not output, said information data field detection means comprises:

a first counting unit which successively counts in byte units all the bytes (Ls+Li) of the received data frames;

a stuff detection unit which examines the supervisory data fields of the respective successive data frames and detects if a negative stuff or a positive stuff is included in the each of the successive data frames or if no negative stuff or positive stuff is included; and an effective information data extraction unit which extracts only the effective portion of said information data corresponding to (1) the case where there is a negative stuff (2), the case where there is a positive stuff, and (3) the case where there is neither negative stuff nor positive stuff, based on the results of detection in said stuff detection unit, said enable signal being output from said effective data extraction unit;

the counting means comprising second counting unit which operates in accordance with said enable signal, and outputs said head detection signal;

said information data field detection means further includes a head position detection unit, said head position detection unit outputting said head detection signal instead of said second counting unit only when neither a negative stuff nor a positive stuff is detected by the stuff detection unit, i.e., only during normal operation, said head position detection unit examines said supervisory data fields of the respective, received data frames detects the head positions indicated by the corresponding pointers included in the respective fields, and outputs a respective head detection signals when the series of byte numbers in the said associated data frames and the head positions indicated by said corresponding pointers match, said first counting unit is comprised of:

a frame synchronization circuit which detects frame synchronization bytes in said supervisory data fields of said associated data frames and establishes frame synchronization and a whole frame counter which successively counts the series of bytes from the head of each of said data frames as detected by said frame synchronization circuit, said stuff detection circuit comprises:

a pointer latch circuit which detects said pointers form the received, said data frame and holds the head positions indicated by the corresponding said pointers; and a stuff detection circuit which analyzes the data pattern of said head positions held in said pointer latch circuit and detects if either a negative stuff or positive stuff is generated when said negative stuff or positive stuff exists, said effective information data extraction unit comprises a stuff control circuit, said stuff control circuit generating said enable signal based on the series of bytes counted by said whole frame counter and the results of detection of said stuff detection circuit, that is, whether the stuff is negative or positive or if there is not stuff, said second counting unit is comprised of:

an information data counter which performs a count operation in accordance with said enable signal as received thereby from said stuff control circuit, and a zero detection circuit which detects zero when the count of said information data counter becomes zero due to a zero reset, said head detection signal being output when zero is detected by said zero detection circuit;

said head position detection unit comprises:

a number counter which indicates the byte number of a series of bytes successively counted by said whole frame counter, and a comparison circuit which operates only when one of the said negative and positive stuff is detected by said stuff detection circuit and detects coincidence or non-coincidence of said head position produced from said pointer latch circuit and said byte number, said head detection signal being output from said comparison circuit and the information data counter being reset to zero when said coincidence is detected.

BRIEF DESCRIPTION OF THE DRAWINGS The above object and features of the present invention will be more apparent from the following description of the preferred embodiments with reference to the accompanying drawings, wherein.

DESCRIPTION OF THE PREFERRED EMBODIMENTS 30 Before describing the embodiments of the present invention, the related art and the disadvantages therein will be described with reference to the related figures.

Figure 1:
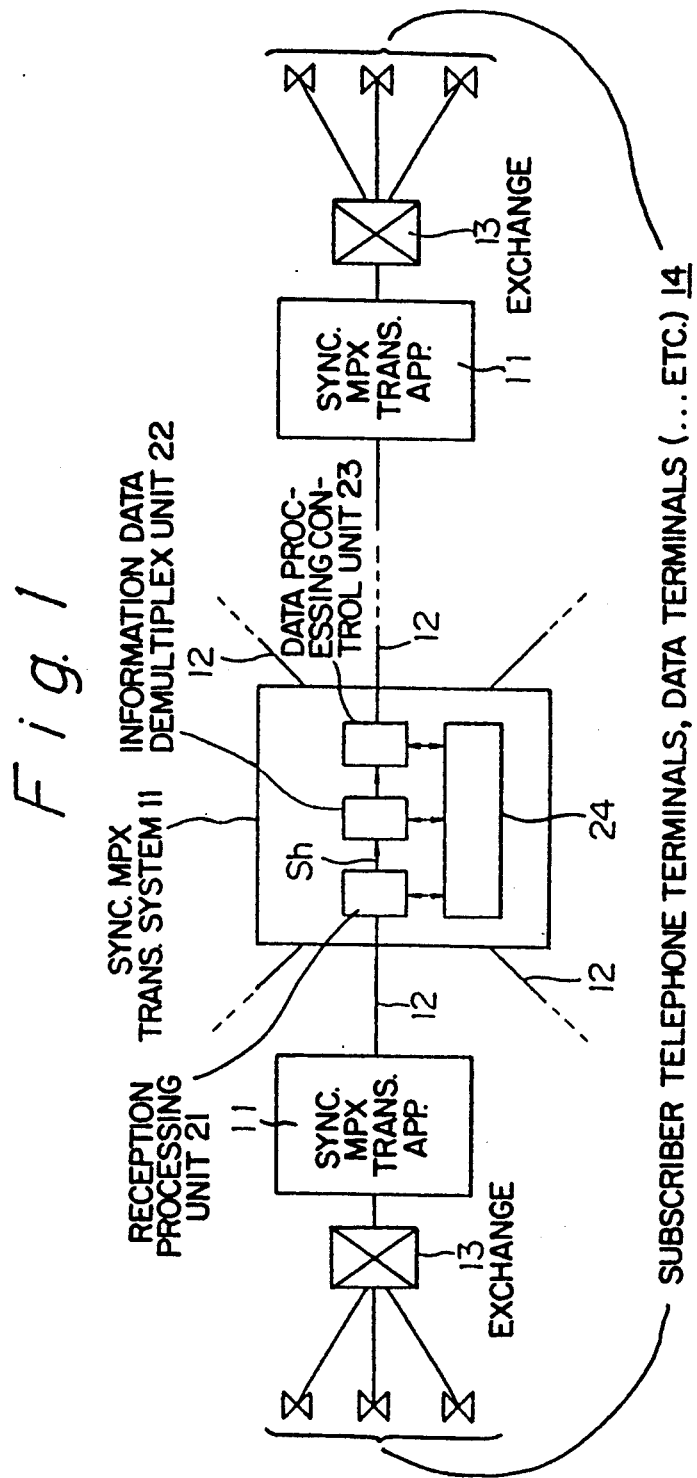
FIG. 1 is a schematic view of the structure of a synchronous multiplex transmission system to which the present invention is applied.

FIG. 1 is a schematic view of the structure of a synchronous multiplex transmission system to which the present invention is applied. In the FIG. 11 is a synchronous multiplex transmission apparatus ("SYNC. MPX. TRANS. APP,") particularly relevant to the present invention, which is inserted at suitable intervals in a long distance transmission line 12. In the figure, only the central synchronous multiplex transmission apparatus 11 is shown in detail. An exchange 13 is also inserted in the transmission line 12. Communication of information data is performed among and between subscriber telephone terminals and data terminals 14, etc.

In the synchronous multiplex transmission, system 11 shown in the center of the figure, primarily the reception processing unit 21 is particularly related to the present invention. The reception processing unit 21 works jointly with an information data demultiplex unit 22. The other portions of system 11 include a data processing control unit 23 and transmission processing unit 24.

Figure 2:
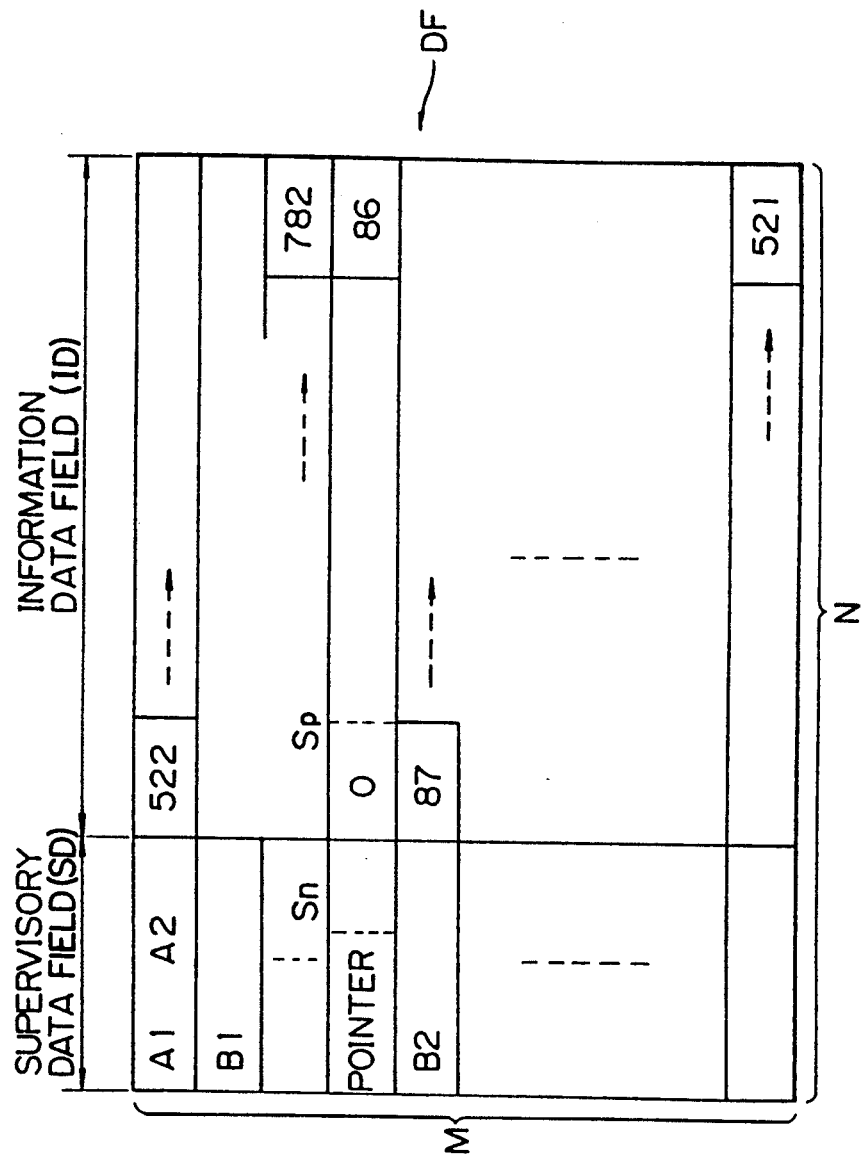
FIG. 2 is a view of the data format of a data frame received and processed by the present invention.

FIG. 2 is a view of the data format of a data, frame received and processed by the reception processing unit 21 of the present invention. The digital data received from the transmission line 12 by the reception processing unit 21 is handled as a predetermined data frame. The data format of the data frame is as shown in the figure. Note that the data format is based on the synchronous transport module 1 (STM1) of the CCITT recommendation. However, in the figure, mainly the portions related to the present invention are shown. One data frame DF is formed as a matrix of M rows and N columns, for example, M=9 and N=90. This "90" means 90 bytes and is the length in the case of 52 Mbps. With a transmission line with a higher degree of multiplexing, for example, 156 Mbps, N=270 (90 ×3) bytes. Therefore, making the explanation in the case of 52 Mbps, one data frame DF is constituted from a series of byte groups of 810 (=9×90) bytes. The byte groups are made of pairs of respectively associated supervisory data fields (left side in the figure) and information data field (right side in the figure). In the supervisory data field, there are a pointer and frame synchronization bytes A1 and A2. B1 and B2 are parity bytes.

The pointer shows the head position of the information data. The position directly after the pointer is the head position (byte number =0). The information data field is constituted by 783 bytes (522→782, 0→521) from the byte number 0 to the byte number 782. The remaining 27 (=810−783) bytes form the supervisory data field. This "27" forms 9 rows ×3 columns. At the position of the pointer may be formed, according to need, a negative stuff Sn and positive stuff Sp related to the present invention.

Figure 3:
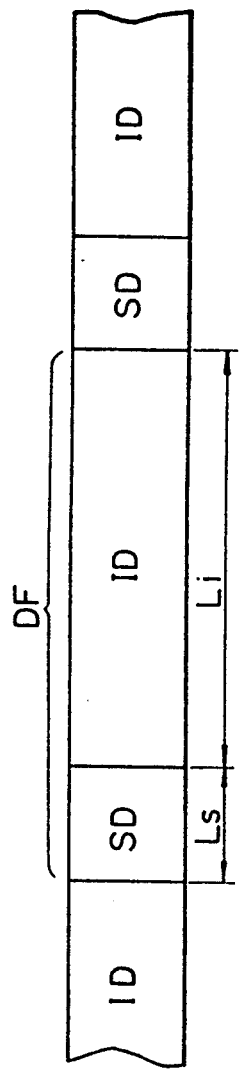
FIG. 3 is a view of the data frame in one dimension.

FIG. 3 is a view of the data frame in one dimension. One data frame DF is formed of a supervisory data field SD and an associated information data field ID. The field SD has a predetermined fixed byte length Ls. The field ID is constituted with a predetermined byte length Li. On the transmission line 12 (FIG. 1) there are successively transmitted a plurality of data frames DF. These are successively received at the reception processing unit 21 (FIG. 1). In this case, the reception processing unit 21 detects the head position of the information data field ID for each of the respective data frames DF and outputs the head detection signal $S_h$. The information data demultiplex unit 22 (FIG. 1) executes the demultiplex operation based on the signal $S_h$.

Figure 4:
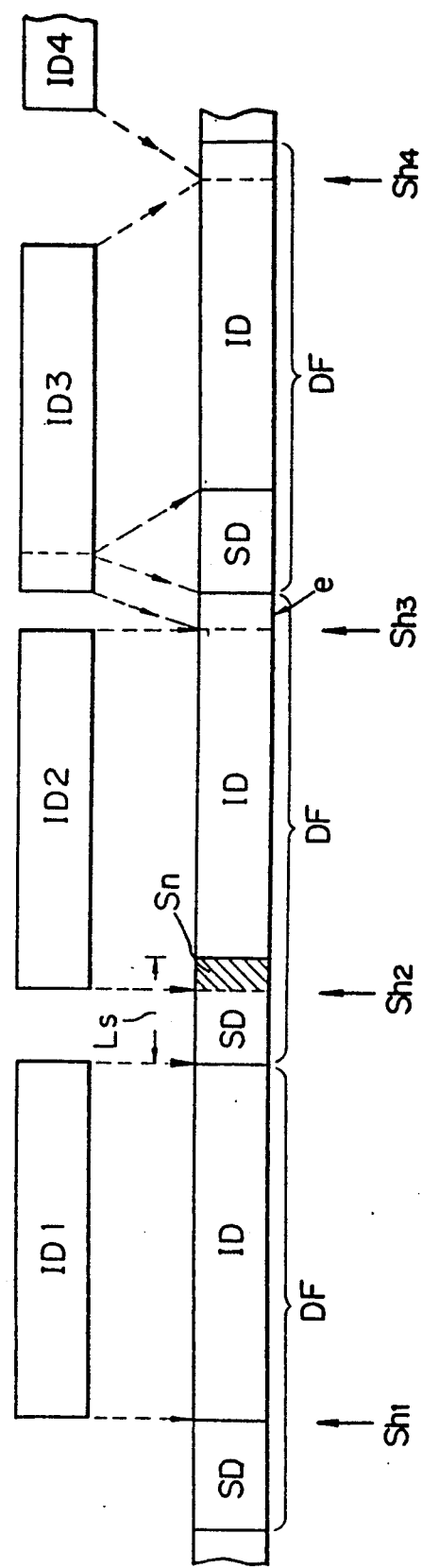
FIG. 4 is a schematic view of the state when a negative stuff is generated.

FIG. 4 is a schematic view of the state when a negative stuff is generated. The upper portion in the figure shows three, representative, successive pieces of information data ID1, ID2, and ID3 out of the series of information data ID as in FIG. 3, while the lower portion shows the series of data frames DF respectively accommodating the data ID1, ID2, and ID3.

Now, assume that the characteristics of the transmission line changes and that the clock frequency deviates, e.g., to a somewhat higher rate. The upstream side synchronous multiplex transmission apparatus generates a negative stuff Sn (FIG. 2). FIG. 4 shows an example where this Sn is inserted in the data frame DF accommodating the information data ID2. Note, that the negative stuff $S_n$. inserts the head position of the information data ID2 in the last single byte (usually a non-used byte) in the above-mentioned pointer (3 bytes) in the supervisory data field SD.

This being the case, the head detection signal $S_h$ in the data frame (central data frame) must be issued at the time slat $S_{h2}$ in FIG. 4. If the negative stuff Sn and a positive stuff Sp are not generated, that is, in the normal transmission state, then as shown in FIG. 4 regarding the information data ID1, the head detection signal $S_h$ is generated as shown by $S_{h1}$ at the time position of the boundary of the field SD and the field ID.

Since a negative stuff Sn is generated for the information data ID2, the central data frame DF accommodating the ID2 has its end shifted forward (in the direction to the side in the figure) and an empty byte e is formed at the end of ID2. To fill this empty byte, the head of the next information data ID3 is entered there. Then, the following supervisory data field SD is jumped and the remaining data ID3 then is received. This being so, the head detection signal $S_h$ for the data ID3 must be generated at the time position of $S_{h3}$ in FIG. 4. As a result, the situation arises where two head detection signals ($S_{h2}$ and $S_{h3}$) are generated in a single data frame DF.

Figures 5, 6:
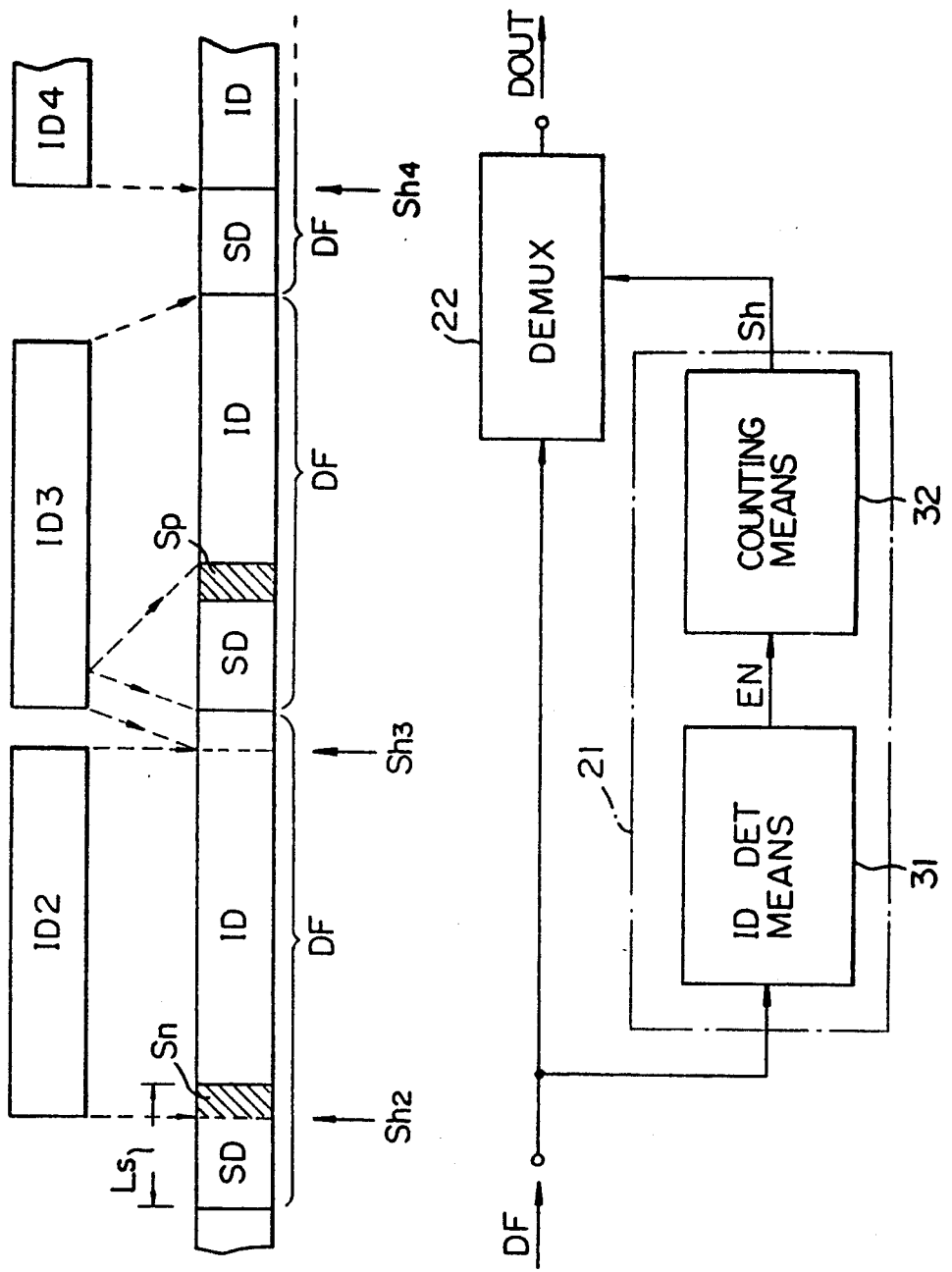
FIG. 5 is a view of the state when a positive stuff is generated.
FIG. 6 is a circuit block diagram illustrating basic functional components of the receiving unit of the present invention.

FIG. 5 is a view of the state when a positive stuff is generated. In particular, it shows an example of the generation of a positive stuff Sp in connection with the information data ID3 of FIG. 4. This Sp is inserted in the upstream side by the synchronous multiplex transmission apparatus system due to changes in the characteristics of the transmission line (e.g., when the clock frequency deviates to a somewhat lower rate). Note that the positive stuff Sp is also shown in FIG. 2. Sp is inserted in the byte directly after the supervisory data field SD in the form of a dummy bit and does not have any information. As shown in FIG. 5, in the state of this figure, the situation occurs where the head detection signal $S_h$ does not occur even once in the data frame (center of figure) DF accommodating the information data ID3.

As mentioned above, in a transmission system using the negative stuff Sn and the positive stuff Sp for synchronous multiplexing, as explained in the above FIG. 4 and FIG. 5, the head detection signal $S_h$ occurs irregularly. Therefore, in the reception processing unit 21, this irregular state has to be accommodated and the timing of occurrence of the head detection signal Sh adjusted adaptively.

With the current level of technology, it is usually attempted to control the above adaptive adjustment by, for example, a microprocessor, using a program. However, when it comes to high speeds such as 156 Mpbs, the load on the microprocessor becomes great. Therefore, the present invention does not rely on the assistance of, such a microprocessor but makes it possible to extract an irregular head detection signal at a high speed by simple hardware.

FIG. 6 is a block diagram of the basic functional components of the receiving unit of the present invention. In the figure, 21 and 22 are the afore-mentioned reception processing unit and information data demultiplexer (DEMUX), respectively. The series of data frames DF received are applied both to the demultiplexer unit 22 and to the reception processing unit 21. The reception processing unit 21 extracts the head detection signal $S_h$ and supplies it to the demultiplexer unit 22, where the demultiplexed information data Dout is obtained.

The reception processing unit 21 of the present invention includes an information data field detection means (ID DET MEANS) 31 and a counting means 32. The information data field detection means 31 calculates only the interval in which all information data field ID exists, and outputs an enable signal EN only during each such interval. Further, the counting means 32 outputs the head detection signal Sh simultaneously, upon being reset to zero each time it completes the counting of a number of bytes equal to the afore-mentioned fixed byte length Li. The counting means 32 continues the counting operation only during the interval in which the enable signal EN is output and stops the counting operation when no enable signal EN is output.

Therefore, even when the afore-mentioned irregular head detection signal $S_h$ occurs, it is possible to automatically generate the head detection signals $S_{h1}$, $S_{h2}$, $S_{h3}$, $S_{h4}$, etc. such as shown in FIG. 4 and FIG. 5 at the respectively specified timings without being aware of the irregular state. Further, the above-mentioned means 31 and 32 can be implemented by a combination of simple hardware (mentioned later).

Figure 7:
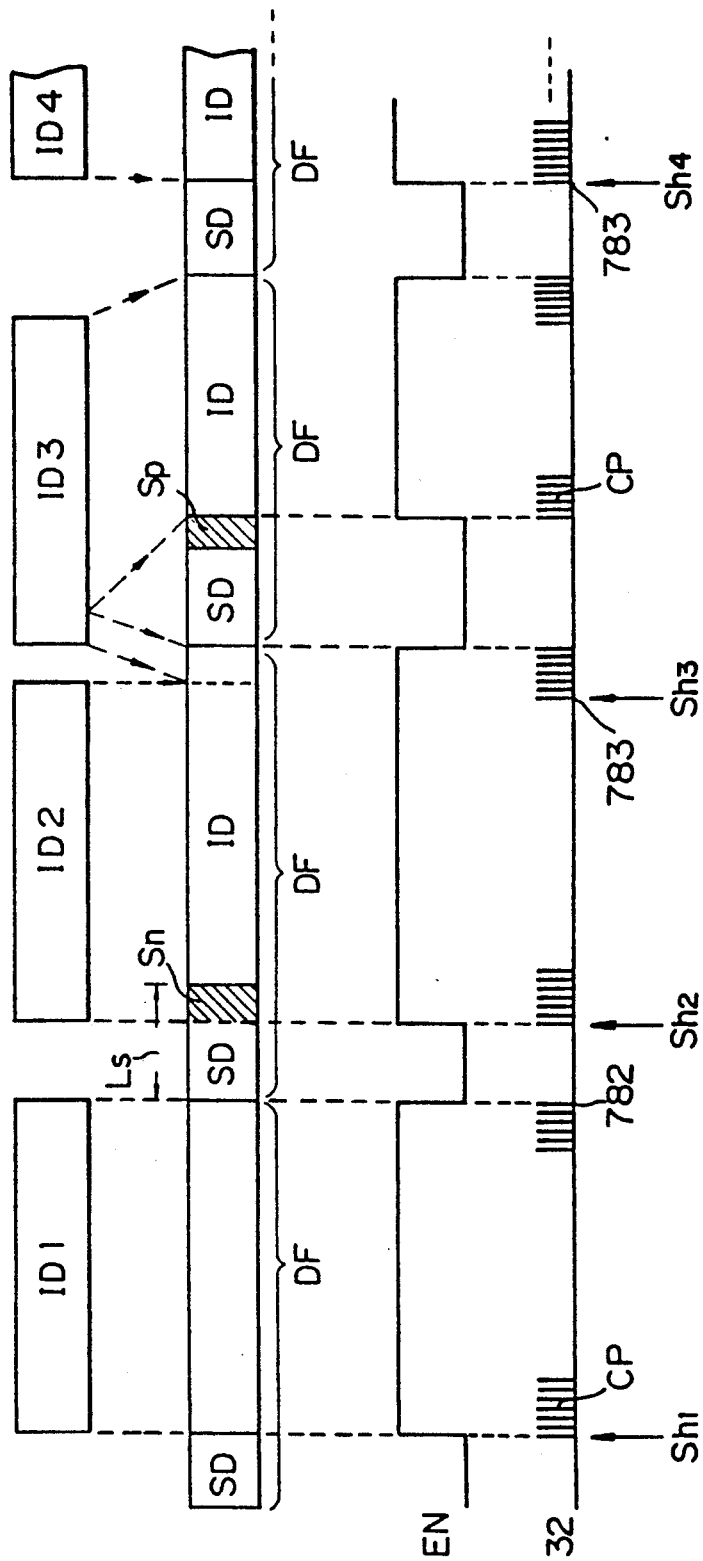
FIG. 7 is a timing chart schematically showing the operating principle of the present invention.

FIG. 7 is a timing chart schematically showing the operating principle of the present invention. The figure enables understanding of the reception processing operation of the present invention. This reception processing operation can be expressed as the following process steps. Before this, however, expressing the reception processing operation simply, as shown in FIG. 7, the counting means 32 always carries out a counting operation during the interval when the enable signal EN is generated (that is, the interval in which an information data field ID exists) and does not perform the counting operation at other times (see count pulse CP in FIG. 7)

Note that the count pulse CP is equivalent to a byte expressed by the smallest box in FIG. 2. Every time the count hits the 783rd (expressed as the next count after 782 in FIG. 2) pulse CP, the head detection signal $S_h$ is generated, such as $S_{h1}$, $S_{h2}$, $S_{h3}$... These $S_{h1}$, $S_{h2}$, $S_{h3}$... are generated without any regard as to the presence or absence of a negative stuff Sn or a positive stuff Sp.

The steps of the above-mentioned reception processing steps are as follows: a first step of calculating only the interval in which an information data field ID is present (i.e., the ID interval); a second step of counting the series of bytes in a data frame DF only during the ID interval calculated in the first step; and a third step in which the afore-mentioned head detection signal is output each time the number of bytes counted in the second step matches the number of bytes equal to the fixed length Li. Explaining this more specifically, the first step includes a fourth step of counting the series of bytes from the head to the end, of the received data frame DF and a fifth step of division of the count of the fourth step into a supervisory data field SD and information data field ID. More specifically, the fifth step includes a sixth step of detecting a pointer in the supervisory data field SD and a seventh step of analyzing the pointer detected in the sixth step and determining the presence of the negative stuff Sn, the presence of the positive stuff Sp, or the nonexistence of both the negative stuff and positive stuff Sn, Sp. Even more specifically, in the first step, (i) when a determination is made in the seventh step that, no negative or positive stuff exists, the interval EN from the byte at the head position designated by the pointer to the, byte equal to the fixed length Li is set as identifying the ID interval (ii) when a determination is made in the seventh step that a negative stuff Sn is present, the leading edge of the interval EN is advanced by exactly one byte from the head position designated by the immediately preceding pointer; and (iii) when a determination is made in the seventh step that a positive stuff Sp is generated, the leading edge of the interval EN is delayed by exactly one byte from the head position designated by the pointer just before. No matter in which of the cases of (i), (ii), and (iii), the high level of the interval EN extending from its leading edge, is so controlled that EN is maintained during the interval of the information data field ID and also during the term corresponding to the fixed byte length Li.

Figure 8:
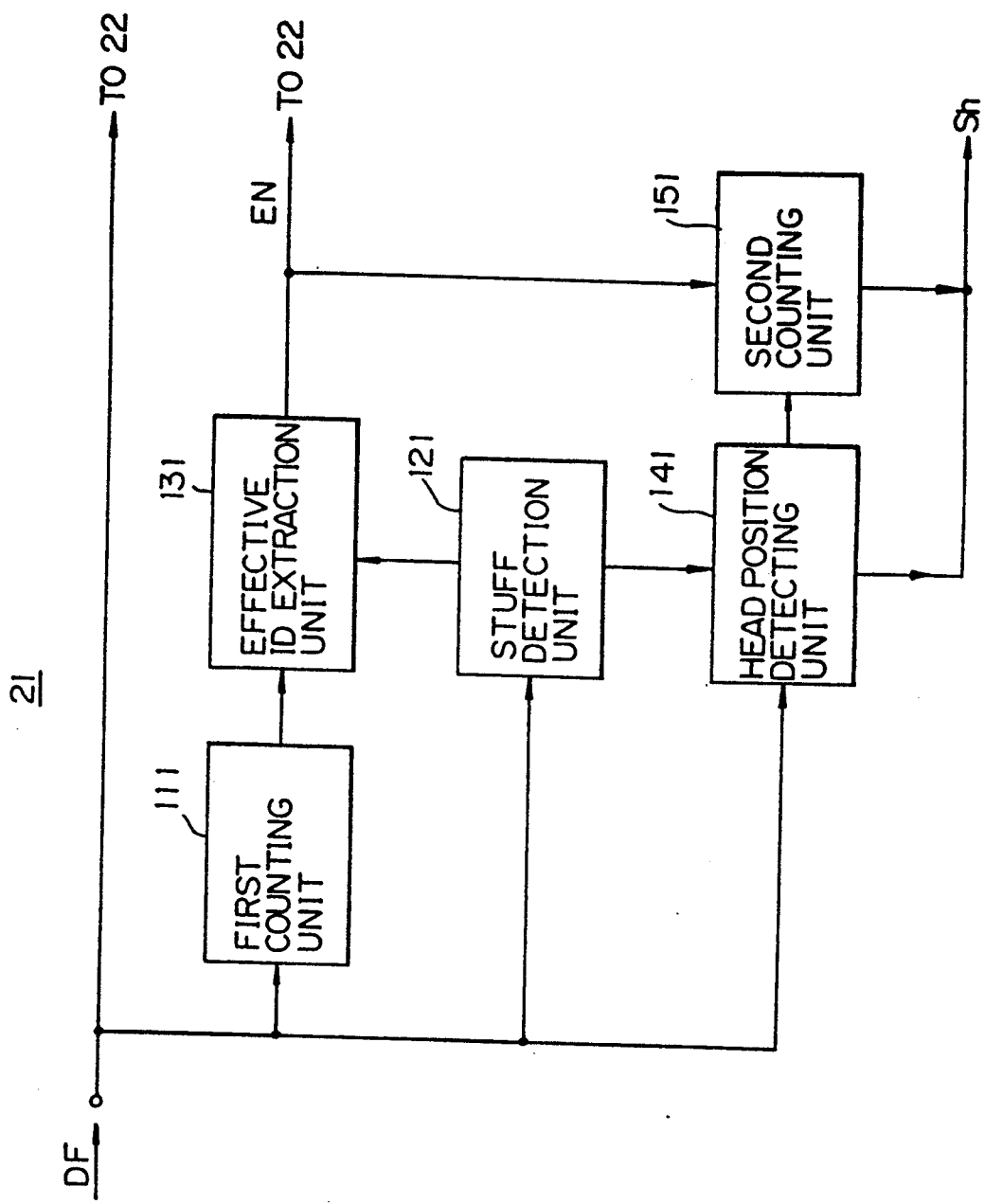
FIG. 8 is a circuit block diagram of one embodiment of an implementation of the functional components of the receiving unit of FIG. 6.

FIG. 8 is a block diagram of one embodiment of an implementation of the functional components of the receiving unit of FIG. 6. Referring to the figure, the above-mentioned information data field detection means 31 includes therein a first counting unit 111 which successively counts in byte units the total bytes (Ls+Li) of each of the successively received data frames DF; a stuff detection unit 121 which analyzes the supervisory data field SD and detects if a negative stuff Sm or positive stuff Sp is included in the data frame DF or if these negative stuff and positive stuff are not included; and an effective information data (ID) extraction unit 131 which extracts only the effective portion of the information data in accordance with the case where there is a negative stuff Sn, the case where there is a positive stuff Sp, and the case where the negative stuff Sn and the positive stuff Sp are not included, based on the detection results in the stuff detection unit 121. An enable signal EN is output from the effective information data extraction unit 131.

In addition to the first counting unit 111, there is a second counting unit 151. This second counting unit 151 constitutes the counting means 32 (FIG. 6) and operates in accordance with the enable signal EN to output the head detection signal $S_h$.

The information data field detection means 31 (FIG. 6) further includes a head position detection unit 141, which head position detection unit 141 outputs a head detection signal Sh instead of the second counting unit 151 doing so, but only when neither of the negative and positive stuff Sn, Sp is detected by the stuff detection unit 121, i.e., only during normal operation.

The head position detection unit 141 examines the supervisory data field SD of each received data frame DF detects the head position designated by the pointer included in the field SD, and outputs the head detection signal Sh when the series of byte numbers in the data frame DF matches the head position indicated by the pointer.

In summary, the first counting unit 111 examines all the 810 bytes, for example, shown in FIG. 2. On the other hand, the stuff detection unit 121 examines the pointer of FIG. 2 and examines or determines further if there is a negative stuff Sn or a positive stuff Sp. Note that whether or not there is an Sn or Sp is determined by analysis of the data pattern of the pointer. Specifically, a plurality of specific bits in the bit train of one byte of the pointer are inverted ("0"→ "1", "1"→"0") with respect to the corresponding bits transmitted just before. A first specific bit group is pre-allotted for the negative stuff Sn, and a second (remaining) specific group is allotted for the positive stuff Sp. If there is no inversion in the specific bit groups it is the normal case where neither a negative stuff nor a positive stuff is generated. The pointer indicates the head position of the information data field.

The effective information data extraction unit 131 outputs the enable signal EN from the head position of the negative stuff Sn of FIG. 2 when the stuff detection unit 121 detects a negative stuff Sn. Conversely, it outputs an enable signal EN from the end position of the positive stuff Sp of FIG. 2 when the stuff detection unit 121 detects the positive stuff Sp. The stuff detection unit 121 outputs a head detection signal Sb (for example, $S_{h1}$ in FIG. 7) directly after the pointer from the head position detection unit 141 if neither the stuff Sn nor the stuff Sp is detected. When the enable, signal EN is output, the second counting unit 151 is driven, and is so driven only during the interval in which EN exists. In the above example, each time the second counting unit 151 finishes counting up to "782", and thus when reset to zero, i.e., either directly or at the next ("783") count pulse CP a head detection signal ($S_h$) such as $S_{h2}$, $S_{h3}$, $S_{h4}$, ... in FIG. 7 is output from the counting unit 151. As explained, the present invention cleverly utilizes the fact that the byte length of the information data field ID is always constant (=Li) regardless of the presence or absence of Sn or Sp.

Figure 9:
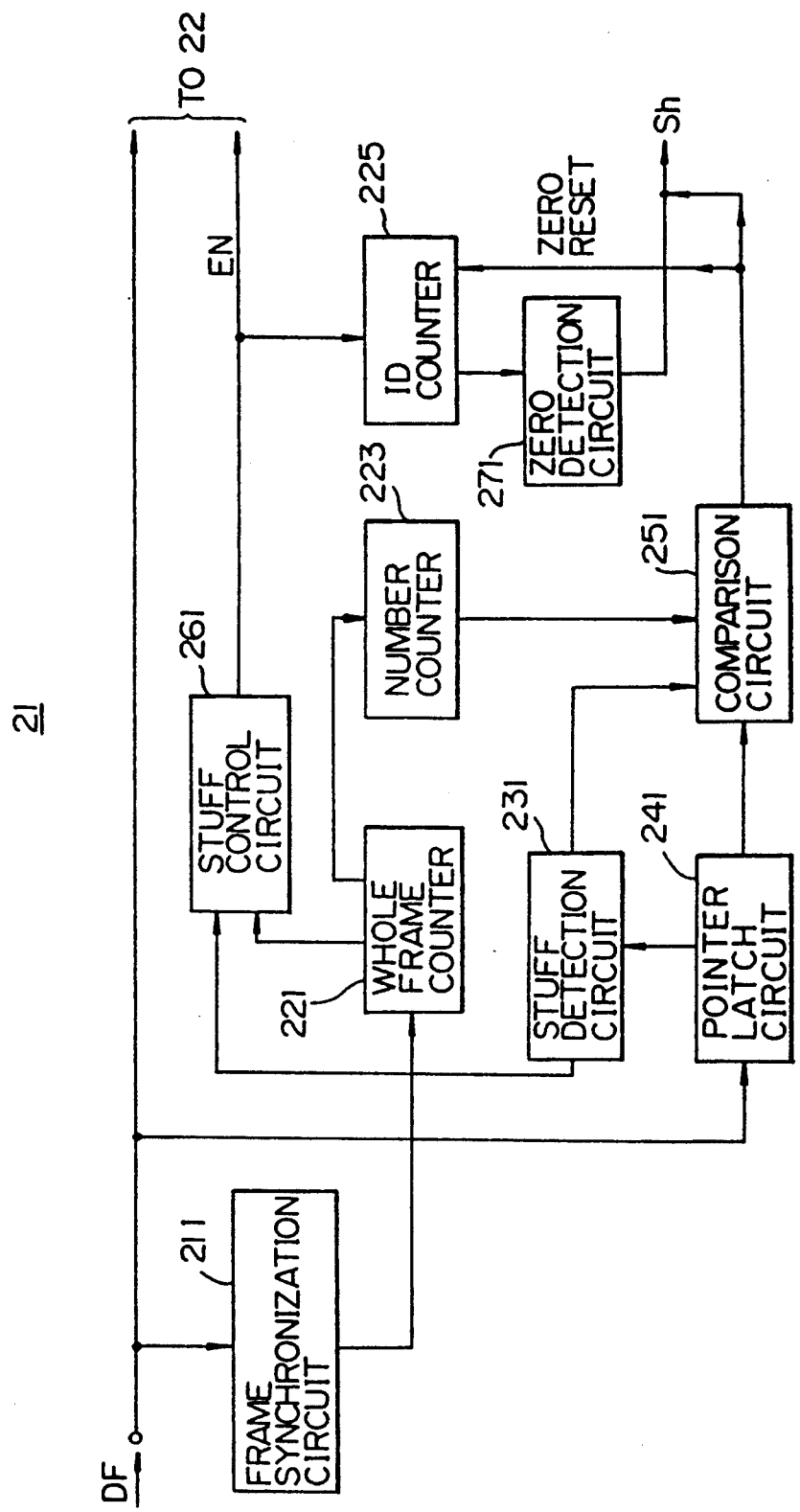
FIG. 9 is a more detailed circuit diagram of the receiving unit of FIG. 8.

FIG. 9 is a more detailed circuit diagram of the receiving unit of FIG. 8. In the figure, the first counting unit 111 of FIG. 8 is implemented by a frame synchronization circuit 211 which detects the frame synchronization bytes (A1, A2 in FIG. 2) in each of the received supervisory data field SD of the data frames DF and establishes frame synchronization and a whole frame counter 221 which successively counts the series of 810 bytes, i.e., the whole frame, from the head (top left corner byte in FIG. 2) of the data frame detected by the frame synchronization circuit 211. Therefore, the whole frame counter 221 works as a reference frame clock source of the reception processing unit 21.

The stuff detection unit 121 of FIG. 8 is constituted by a pointer latch circuit 241 which detects the above-mentioned pointer from the received data frames DF and holds the head position indicated by the pointer, and a stuff detection circuit 231 which analyzes the data pattern of the head position held in the pointer latch circuit 241 and detects if a negative or positive stuff is generated when a negative stuff Sn or positive stuff Sp exists. Regarding the data pattern, as already explained, when inversion of a specific bit group ("0"→"1", "1"→"0") is detected, it is known that a negative stuff Sn or positive stuff Sp is generated. An example will be shown below.

Assuming that the pointer in the next preceding data frame indicates, for example, the pointer value of 1, for example, a pointer expressed by 10 bits will be as follows:

| p | n | p | n | p | n | p | n | p | n |     |
|---|---|---|---|---|---|---|---|---|---|-----|
| 0 | 0 | 0 | 0 | 0 | 0 | 0 | 0 | 0 | 1 | (1) |

When it is detected that the received pointer is as the following (2):

| p | n | p | n | p | n | p | n | p | n |     |
|---|---|---|---|---|---|---|---|---|---|-----|
| 0 | 1 | 0 | 1 | 0 | 1 | 0 | 1 | 0 | 0 | (2) | the first bit group (n) is bit inverted, so it is known that a negative stuff Sn is inserted in the data frame DF now being received.

Conversely, if it is detected that the received pointer is as the following (3):

| p | n | p | n | p | n | p | n | p | n |     |
|---|---|---|---|---|---|---|---|---|---|-----|
| 1 | 0 | 1 | 0 | 1 | 0 | 1 | 0 | 1 | 1 | (3) | the second bit group (p) is inverted, so it is known that a positive stuff Sp is inserted in the data frame DF now being received.

Whatever the case, if the stuff Sn or Sp is indicated by the pointer, the value of the pointer at that time becomes completely meaningless, so the stuff detection circuit 231 stops the operation of comparison circuit 251. The reason is that, the comparison circuit 251 operates when receiving a meaningful pointer value, held by the pointer latch circuit 241, as an input. Note that the comparison circuit 251 and the number counter 223 function effectively under normal conditions where the stuff Sn and Sp are not present. An explanation will be made of these below.

The present invention is particularly beneficial in the case where one of the stuff Sn and Sp is generated, so the explanation will be made of the portion of the circuit which functions in such a case.

The effective information data extraction unit 131 of FIG. 8 is implemented by a stuff control circuit 261 in FIG. 9. The stuff control circuit 261 generates the enable signal EN based on the series of bytes counted by the whole frame counter 221 and based on the detection results of the stuff detection circuit 231, that is, the negative stuff or positive stuff or the lack of either such stuff. Note that a detailed example of the stuff control circuit 261 is disclosed later together with a detailed example of the whole frame counter 221.

The second counting unit 151 in FIG. 8 is implemented, as shown in FIG. 9, by an information data (ID) counter 225 which performs a count operation in accordance with the enable signal EN from the stuff control circuit 261, and a zero detection circuit 271 which detects zero when the count equals zero by the above-mentioned zero reset (explained in FIG. 6). When a zero is detected by the zero detection circuit 271, the head detection signal $S_h$ is output. The information data counter 225 may be implemented by a general counter provided with a count enable terminal. It receives byte units of pulses from the whole frame counter 221 at, the counting input and counts up only during the interval when the enable signal EN exists. However, when a number of pulses equal to the number of all bytes of the information data field ID is received, the count returns to zero. When a signal EN is once again received, the counting unit counts up again. The zero detection circuit 271, which detects if the count is zero, may be implemented by a decoder which uses, for example, the output bit group of the counter 225 as an input. The head detection signals $S_{h2}$, $S_{h3}$, $S_{h4}$.. shown in FIG. 7 are output from the zero detection circuit 271. When no stuff pulse Sn, Sp appears (normal times), the head detection signal, for example, $S_{h1}$ in FIG. 7, is generated from the circuit portion mentioned below. Note that when the stuff pulse Sn, Sp does not appear, it means that there are no changes in the characteristics of the transmission line (mentioned earlier) and further there has been no change of lines. When the communication traffic is large, a bypass route is selected. When the line is switched to a bypass route, a large deviation, which cannot be adjusted by the stuff pulse Sn, Sp, is generated between the transmission side data frame and the reception side data frame. At this time, the head position of the information data field must be specified, based on the pointer value indicated . by the pointer. This pointer value is held in the pointer latch circuit 241 (FIG. 9), mentioned earlier, with each arrival of a data frame DF. The held pointer value and the count value of the number counter 223 are compared by the aforementioned comparison circuit 251. These circuits correspond to the head position detection unit 141 of FIG. 8. That is, the head position detection unit 141 of FIG. 8 is implemented by the afore-mentioned number counter 223, which indicates the byte number of the series of bytes successively counted by the afore-mentioned whole frame counter 221, and the afore-mentioned comparison circuit 251, which operates only when neither the positive stuff or negative stuff Sn, Sp has been detected by the stuff detection circuit 231 and which detects coincidence or noncoincidence of the ID head position and byte number from the pointer latch circuit 241. When coincidence is detected, the head detection signal $S_h$ is output from the comparison circuit 251 and the information data counter 225 is reset to zero. The ID counter 225 is reset to zero since, if some value remains in the ID counter 225, the value becomes erroneous and at the time when the enable signal EN is next generated, an offset ends up occurring in the output of the counter 225. Note that, looking at the number counter 223, it is possible to use a read only memory (ROM) instead of the number counter 223. This ROM receives the count output from the whole frame counter 221 (i.e., a count value of 810, from 0 to 809, in the above-mentioned example) as the address-input. When the count is a value corresponding to the information data field ID, according to the afore-mentioned example, it operates so as to output 0 to 782.

Figure 10:
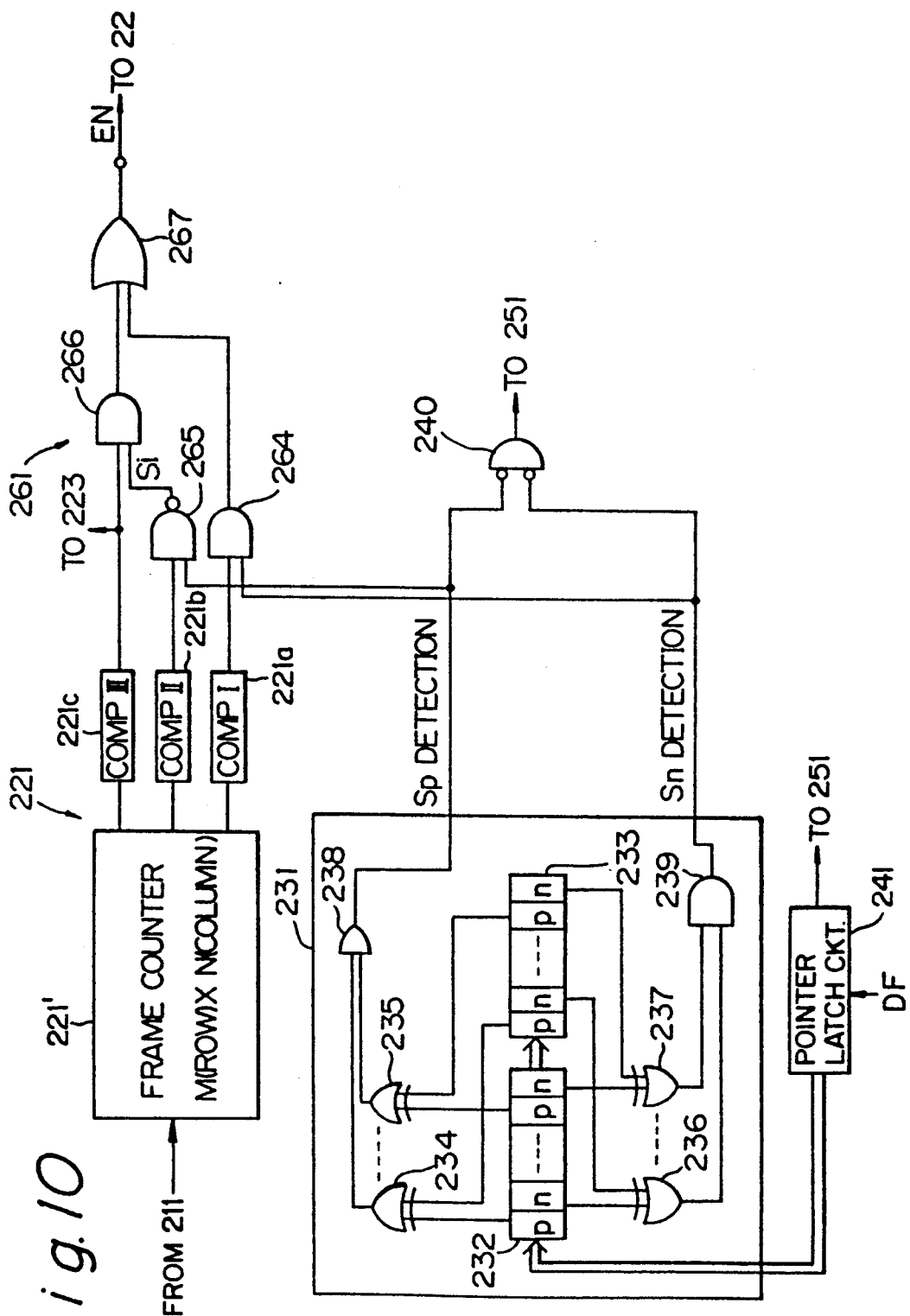
FIG. 10 is a further detailed circuit diagram of an example of the circuits 221, 241, and 261 in FIG. 9.

FIG. 10 is a detailed view of an example of the circuits 221, 231, and 261 in FIG. 9. Note that in FIG. 9, the frame synchronization circuit 211 is known. The pointer latch circuit 241 may be implemented by, a known shift register, the counters 223 and 225 may each be implemented by a known counter, the comparison circuit 251 (shown only by to 251 of) may be implemented by a correctional digital comparator, and the zero detection circuit 271 may be realized by a known decoder, as mentioned earlier, so disclosure of detailed examples of the same will be omitted.

Referring to FIG. 10, the whole frame counter 221 of FIG. 9 is implemented by a frame counter 221 which counts the M×N series of bytes (illustrated in FIG. 2) constituting a data frame DF having the data format expressed by M rows and N columns from the head of each of the data frames DF to the end thereof; a first comparator (COMP I) 221a which detects whether or not the count of the frame counter 221' matches with a predetermined byte position (see Sn in FIG. 2) for insertion of the negative stuff Sn; a second comparator (COMP II) 221b which detects whether or not the count of the frame counter 221' matches with a predetermined byte position (see Sp in FIG. 2) for insertion of the positive stuff Sp; and a third comparator (COMP III) 2261c which detects whether or not the count of the frame counter 223 matches with a predetermined byte position (see "INFORMATION DATA" in FIG. 2) for insertion of the information data. The outputs of the first and second comparators 221a and 221b are applied to the stuff control circuit 261, while the output of the third comparator 221c is applied to both the stuff control circuit 261 and the number counter 223.

The stuff control circuit 261, as shown in FIG. 10, is constituted by: a first gate (AND) 264 which outputs the enable signal EN when the two conditions are satisfied that (i) the stuff detection circuit 231 detects the occurrence of the negative stuff Sn (Sn DETECTION) and (2) there is a coincidence output from the first comparator 224; a second gate (NAND) 265 which outputs an inhibit signal Si which stops the transmission of the enable signal EN when the two conditions are satisfied that (1) the stuff detection circuit 231 detects the occurrence of the positive stuff Sp (Sp DETECTION) and there is coincidence output from the second comparator 221b; a third gate (AND) 266 which sends the enable signal EN while coincidence is being detected with the byte group (ID) by the third comparator 226 and while the inhibit signal Si is not being output from the second gate 265 (Si="H"); and a fourth gate (OR) 267 which produces a logical OR processing of the outputs from the first gate 264 and the third gate 266 and uses it as the enable signal EN.

The stuff detection circuit 231 has a first stage shift register 232 and second stage shift register 233. The register 232 stores the current pointer and the register 233 stores the pointer of the preceding data frame as supplied from the register 232; EOR gates (EOR) 234 and 235 detect the presence or absence of the occurrence of the already mentioned bit inversion for the second bit group (p), while EOR gates 236 and 237 detect the already mentioned bit inversion for the first bit group (n). If there is bit inversion for the second bit group (p), an Sp DETECTION signal is output from the AND gate 238. Conversely, if there is bit inversion for the first bit group, an Sm DETECTION signal is output from the AND gate 239. Unless both the Sp and Sn DETECTION signals appear, the output of the NOR gate 240 becomes "H" (high) and the comparison circuit 251 (FIG. 9) is made active.

As explained above, according to the present invention, both the regular head detection signal $S_{h1}$ shown in FIG. 7 and the irregular head detection signals $S_{h2}$, $S_{h3}$, and $S_{h4}$ arising due to the stuffs Sn, and Sp are automatically obtained by simple hardware without the aid of a computer.

We claim:

1. A reception processing unit in a synchronous multiplex transmission system, the reception processing unit receiving a data transmission of successive bytes, transmitted at a predetermined byte rate and organized as successive, plural data frames, each data frame including a supervisory data field of a fixed byte length, Ls, and an associated, information data field having a head position and being of a fixed byte length, Li, each supervisory data field including a pointer, which indicates the head position of the information data field in each data frame absent any stuff, and frame synchronization bytes, and wherein either a negative or a positive stuff may be present, or absent, in any such data frame, and, when present, each positive stuff and each negative stuff respectively advances and delays the head position of the information data field relative to the head position indicated by the pointer and correspondingly advances and delays the time interval of the effective information data field relatively to the time interval of the respectively associated data frame, said reception processing unit functioning to detect the respective head positions of respective information data fields of successive, data frames, as received thereby, and outputting successive head detection signals for identifying the corresponding head positions of said respective, successive information data fields and successive enable signals for enabling the extraction of said respective and successive, effective information data fields, and comprising:

information data field detection means for detecting each said time interval in which an effective information data field exists and outputting an enable signal corresponding to, and during, that time interval, and counting means, respective to and enabled by each said enable signal, for performing a counting operation, said counting means including means for generating byte count pulses corresponding to the successive bytes of the data transmission, means for defining the fixed byte length Li as a predetermined count value Li, and said counting means counting the byte count pulses only during receipt of the enable signal and terminating the counting operation of the byte count pulses when the enable signal terminates, said counting means further including means for resetting the count thereof to zero in response either to a reset signal applied thereto or to the count thereof reaching the fixed byte count Li;

said information data field detection means comprising:

a first counting unit which continuously counts the successive byte count pulses for the combined total bytes (Ls+Li) of each of said successive data frames, as received, a stuff detection unit which receives and examines the respective supervisory data fields of said successive, received data frames and detects the presence or absence of a negative stuff or a positive stuff in each thereof and produces corresponding negative and positive stuff detection outputs, an effective information data extraction unit which is responsive to the negative and positive stuff outputs of said stuff detection unit and produces said enable signals as an output thereof, each said enable signal being produced during the time interval of, sand thereby enabling the selective extraction of, the effective information data field of a corresponding data frame of the received data transmission, regardless of the advanced or delayed relationship thereof relatively to the corresponding, successive data frame, and a head position detection unit which is responsive to the absence of any negative or positive stuff output of said stuff detection unit, and thus the absence of the detection of any positive or negative stuff in a received data frame, and further is responsive to the head position indicated by the associated pointer for each such data frame, and produces the head position detection output, said head position detection unit receiving and examining said successively received supervisory data fields of respective, said successive data frames and detecting the corresponding head positions indicated by the pointers thereof and outputting said head detection signals when, for each said data frame, the series of byte numbers of the data frame matches the head position indicated by the pointer for that data frame; and said counting means comprising a second counting unit which is operative in response to receipt of said enable signal for producing said head detection signal as an output thereof for each said information data field for which a negative or a positive stuff is present in the respective data frame;

said first counting unit more particularly comprising:

a frame synchronization circuit which detects the frame synchronization bytes in each of said supervisory data fields of said successively received and respective data frames, and establishes frame synchronization for the successive data frames, and a whole frame counter which is enabled for counting be each said frame synchronization output and count, in succession, the series of byte count pulses, from the head position, of each said data frame;

said stuff detection circuit more particularly comprising:

a pointer latch circuit which receives and detects each said pointer from said respective, successive data frames and, for each said detected pointer, stores the head position indicated by said detected pointer, a stuff detection circuit which receives and analyzes each of said head positions, as detected and stored in said pointer latch circuit, and detects, in accordance with the data pattern of the pointer defining each said head position, whether a positive or negative stuff is present in the corresponding data frame, and said effective information data extraction unit comprising a stuff control circuit which generates and produces said enables signal output, said stuff control circuit being responsive to the count output of said whole frame counter, corresponding to the series of bytes of the data frame counted thereby and, selectively, producing the negative and positive stuff detection outputs of said stuff detection circuit;

said second counting unit more particularly comprising:

an information data counter which, in response to said enable signal output of said stuff control circuit, performs a counting operation in accordance with the successive byte count pulses of the received data transmission, and a zero detection circuit which produces the head detection signal output, said zero detection circuit detecting a zero reset count value of said information data counter and, in response thereto, producing said head detection signal output; and said head position detection unit more particularly comprising:

a number counter which indicates the byte number of a series of bytes successively counted by said whole frame counter, and a comparison circuit which is responsive to and rendered operational only in the absence of both said negative and positive stuff detection outputs of said stuff detection circuit and, when operation, detects coincidence or noncoincidence of said head position produced from said pointer latch circuit and said byte number, said head detection signal being output by said comparison circuit and the information data counter being reset to zero when said coincidence is detected.

2. A reception processing unit in a synchronous multiplex transmission system according to claim 1, wherein each said data frame has a format of M rows of bytes by N columns of bytes and correspondingly a total byte of $M \times N$ bytes and, in each said data frame, said positive and negative stuffs, if present, occupy respective, predetermined byte positions in said total byte length and wherein said whole frame counter comprises:

a frame counter which counts said byte count pulses to a total byte count value of $M \times N$ bytes, starting from the data frame head position and corresponding to each complete said data frame;

a first comparator which detects when the count of said frame counter coincides with the predetermined byte count position for a negative stuff;

a second comparator which detects when the count of said frame counter coincides with the predetermined byte count position for a positive stuff; and a third comparator which detects the count output of the frame counter and compares same with the predetermined byte count positions of the information data field in each said data frame and produces a coincidence output for each count of said frame counter which coincides with the information data field predetermined byte count positions;

each of said first, second and third comparators producing corresponding outputs, and the outputs of said first, second and third comparators being applied to said stuff control circuit and the output of said third comparator further being applied to said number counter.

3. A reception processing unit in a synchronous multiplex transmission system according to claim 1, wherein said stuff control circuit comprises:

a first gate which receives the negative stuff detection output and the first comparator output and, in response to the coincidence thereof, outputs the enable signal;

a second gate which receives the positive stuff detection output of the stuff detection circuit and the output of the second comparator, and in reposes to the coincidence thereof, outputs an inhibit signal for inhibiting the output of the enable signal;

a third gate which receives the output of the second gate and the third comparator output and is responsive to the absence of the inhibit signal output from the second gate and the presence of a coincidence output of the third comparator for producing an enable output; and a fourth gate which receives the outputs of the first, second and third gates and performs logical OR processing thereof and produces the logical OR outputs of the first, second and third gates as the enable signal output of said stuff control circuit.

* * * * *